United States Patent
Tahon et al.

(10) Patent No.: US 11,459,447 B2
(45) Date of Patent: *Oct. 4, 2022

(54) WIRE COAT RUBBER COMPOSITION FOR A TIRE AND A TIRE COMPRISING A WIRE COAT RUBBER COMPOSITION

(71) Applicant: THE GOODYEAR TIRE & RUBBER COMPANY, Akron, OH (US)

(72) Inventors: Julia Martine Francoise Claudine Tahon, Reckange (LU); Robert Anthony Bethea, Cincinnati, OH (US); James Joseph Golden, North Canton, OH (US); Carolin Anna Welter, Schleich (DE); Christian Jean-Marie Kaes, Schrondweiler (LU)

(73) Assignee: THE GOODYEAR TIRE & RUBBER COMPANY

( * ) Notice: Subject to any disclaimer, the term of this patent is extended or adjusted under 35 U.S.C. 154(b) by 213 days.

This patent is subject to a terminal disclaimer.

(21) Appl. No.: 16/903,502

(22) Filed: Jun. 17, 2020

(65) Prior Publication Data

US 2020/0399448 A1    Dec. 24, 2020

Related U.S. Application Data

(60) Provisional application No. 62/864,613, filed on Jun. 21, 2019.

(51) Int. Cl.
*C08L 7/00*    (2006.01)
*B60C 9/00*    (2006.01)

(52) U.S. Cl.
CPC .............. *C08L 7/00* (2013.01); *B60C 9/0007* (2013.01); *B60C 2009/0021* (2013.01); *C08L 2203/202* (2013.01); *C08L 2205/03* (2013.01)

(58) Field of Classification Search
CPC .. C08L 7/00; C08L 2203/202; C08L 2205/03; B60C 9/0007; B60C 2009/021; B60C 2009/0021
USPC ........................................................ 152/526
See application file for complete search history.

(56) References Cited

U.S. PATENT DOCUMENTS

| | | | |
|---|---|---|---|
| 5,760,114 A * | 6/1998 | Wideman | C08K 5/18 524/254 |
| 7,514,494 B2 | 4/2009 | Lectenboehmer et al. | |
| 8,415,426 B1 | 4/2013 | Hua | |
| 8,772,374 B2 | 7/2014 | Agostini et al. | |
| 9,133,281 B2 | 9/2015 | Kaszas | |
| 2003/0083516 A1* | 5/2003 | Korth | C09C 1/42 106/491 |
| 2006/0183831 A1* | 8/2006 | Hsu | B60C 1/0016 524/262 |
| 2009/0151838 A1 | 6/2009 | Sandstrom et al. | |
| 2011/0136969 A1 | 6/2011 | Hahn et al. | |
| 2013/0096260 A1 | 4/2013 | Hahn et al. | |
| 2016/0200899 A1* | 7/2016 | Forciniti | B60C 1/0016 523/156 |
| 2020/0070579 A1 | 3/2020 | Tahon et al. | |

FOREIGN PATENT DOCUMENTS

| | | |
|---|---|---|
| EP | 1191057 B1 | 12/2004 |
| EP | 1712587 B1 | 5/2008 |
| EP | 1726617 B1 | 5/2008 |
| EP | 2033811 B1 | 9/2010 |
| JP | 2007145898 A * | 6/2007 |
| JP | 2007145898 A | 6/2007 |
| JP | 105367851 A | 3/2016 |

OTHER PUBLICATIONS

JP 2007-145898 A, machine translation, EPO espacenet. (Year: 2007).*

First Office Action dated Jun. 1, 2022 for Chinese Patent Application No. 202010572995.4 which is the Chinese counterpart to the subject patent application.

* cited by examiner

*Primary Examiner* — Josephine L Chang
(74) *Attorney, Agent, or Firm* — Alvin T. Rockhill

(57) ABSTRACT

In accordance with the invention a wire coat rubber composition for a tire comprises from 70 phr to 100 phr of cis 1,4-polyisoprene rubber, from 0 phr to 30 phr of solution styrene butadiene rubber, from 65 phr to 95 phr pre-silanized precipitated silica, from 0.1 phr to 5 phr of a cobalt salt, up to 15 phr carbon black, up to 10 phr of a resin, and up to 10 phr oil. Further the present invention is directed to a tire comprising such a wire coat composition.

14 Claims, 1 Drawing Sheet

WIRE COAT RUBBER COMPOSITION FOR A TIRE AND A TIRE COMPRISING A WIRE COAT RUBBER COMPOSITION

This application claims benefit of U.S. Provisional Patent Application Ser. No. 62/864,613, filed on Jun. 21, 2019. The teachings of U.S. Provisional Patent Application Ser. No. 62/864,613 are incorporated herein by reference in their entirety.

FIELD OF THE INVENTION

The present invention is directed to a rubber composition for use in a tire, in particular a wire coat rubber composition as for instance for carcass, belt or overlay plies or ply strips. Moreover, the present invention is drawn to a tire comprising such components and/or compositions.

BACKGROUND

While tire performance has improved significantly over decades and the use of silica in tire compounds has resulted in rolling resistance improvements, there is still significant room for improvement. In an effort to further reduce vehicles emissions, there is a desire to further reduce rolling resistance of tires for multiple applications, including primarily passenger car tires but also truck tires.

One example of a wire coat composition is disclosed in US2009/0151838 A1. The composition disclosed therein is essentially based on natural rubber and a conventional silica filler. In order to improve the coupling of the silica filler to the rubber matrix, a coupling agent is added during the mixing process. However, addition of such coupling agents results in relatively long mixing times. Moreover, said composition comprises a resin system comprising two components in the form of a methylene donor and a methylene acceptor as they are known in the prior art. While the addition of such a resin system may result in some advantages it also has some disadvantages as for instance potential issues with regards to environment, health and safety as well as a more complex mixing process. While this composition may have advantages over the prior art, there is still room for improvement left.

SUMMARY OF THE INVENTION

A first object of the invention may be to provide rubber compositions that allow building tires or tire components, especially wire reinforced plies or ply strips, supporting a reduced rolling resistance of the tire.

Another object of the invention may be to provide a rubber composition with relatively high rebound, limited loss factor and/or improved hysteresis properties.

Another object of the invention may be to provide improved compositions for ply or ply strip coatings, in particular for passenger car tires.

In one aspect of the invention a rubber composition is provided, in particular a wire coat rubber composition for a tire or tire component, comprising from 70 phr to 100 phr of cis 1,4-polyisoprene rubber, from 0 phr to 30 phr of solution (polymerized) styrene butadiene rubber (SSBR), from 65 phr to 95 phr pre-silanized precipitated silica, up to 15 phr carbon black, up to 10 phr of a resin and up to 10 phr oil.

In particular, the use of pre-silanized (pretreated and/or pre-hydrophobated) precipitated silica or in other words chemically pre-treated silica (CTS) in the composition of the invention is an important aspect. While the use of silica or HDS silica has been known for a long time in combination with separate coupling agents introduced into the rubber composition during the mixing stage, the pre-silanized silica as used in the present invention has been pre-silanized with a silane and is added as pre-silanized substance into the rubber composition, respectively the mixing process, in other words as an educt or reactant. Pre-silanizing the silica ensures a better compatibility with the rubber matrix.

This composition may be used for wire coatings, in particular for passenger car tires, with the benefit of reducing hysteresis or rebound and with the aim to reduce rolling resistance in tires. The wires could for instance be embedded in carcass plies, belt plies or overlay plies or ply strips.

Cis 1,4-polyisoprene rubber as such is known to a person skilled in the art and may refer herein to natural rubber as well as to synthetic polyisoprene rubber. A reference to cis 1,4-polyisoprene may be understood as a 1,4-polyisoprene having at least 90 percent cis content, preferably at least 92 percent cis-content or at least 95 percent cis-content.

In another embodiment, the rubber composition comprises from 0.1 to 5 phr of a cobalt salt, preferably from 0.1 phr to 5 phr of a cobalt salt, and most preferably from 0.2 to 2 phr of a cobalt salt. This content may be of particular interest if used in ply coating compounds as it may amongst others improve the adhesion of the rubber coating to the ply or belt material, in particular if such material is metal, preferably brass coated metal as for instance steel. However, in another embodiment the rubber composition may be essentially cobalt free, e.g. comprise less than 0.1 phr cobalt salt or 0 phr cobalt salt. The cobalt compound will typically be a cobalt salt of a fatty acid or a cobalt salt of an aliphatic or alicyclic carboxylic acid containing from 6 to 30 carbon atoms. Some representative examples of cobalt compounds which may be used include the cobalt salts, cobalt naphthanate, cobalt linoleate, cobalt stearate, cobalt oleate, cobalt acetate, cobalt neodecanoate, cobalt tallate, cobalt resinate, cobalt acetonate, or in situ salts prepared from cobalt hydroxide and an organic acid such as naphthenic acid, stearic acid, oleic acid, acetic acid, linoleic acid and the like. Additional cobalt compounds which may be used are known under the tradename Manoband™ C. Manoband™ C is a cobalt complex of an organic acid containing boron manufactured by Manchem Company. Manoband™ C is described in British Patent No. 972,804, which is incorporated by reference in its entirety.

In another embodiment, the rubber composition comprises from 1 to 20 phr zinc oxide, alternatively from 5 to 15 phr zinc oxide. Again, these relatively high amounts of zinc oxide may help to improve adhesion between metal wire, e.g. in the ply or belt, and the coating rubber compound upon sulfur curing.

In yet another embodiment, the composition comprises from 1 to 15 phr sulfur, alternatively from 3 to 10 phr sulfur. It has been found that these ranges offer a preferable sulfur amount for curing purposes of the present compositions. In particular, such relatively high sulfur amounts can be advantageous when using less resin with regards to the adhesion of the coating to the belt or carcass wires, in particular when using brass coated metal wires.

In accordance with another embodiment, the rubber composition comprises between 1 phr and 5 phr of a resin. This preferred amount of resin may help to improve stiffness of the compound and/or adhesion of the rubber compound to the wire. In particular, the resin may comprise a phenol and a methylmelamine.

In a further embodiment, the pre-silanized and precipitated silica has a CTAB adsorption surface area of between 130 m²/g and 210 m²/g, optionally between 130 m²/g and 150 m²/g and/or between 190 m²/g and 210 m²/g, or even between 195 m²/g and 205 m²/g. The CTAB (cetyl trimethyl ammonium bromide) method for determination of the silica surface area (ASTM D6845) is known to the person skilled in the art.

In another embodiment, said pre-silanized precipitated silica is precipitated silica pre-reacted with a silica coupler comprised of bis(3-triethoxysilylpropyl)polysulfide containing an average of from 1 to 5 connecting sulfur atoms (preferably 2 to 4) in its polysulfidic bridge or an alkoxyorganomercaptosilane.

The mercaptosilane with its SH groups may improve compatibility with the rubber material or rubber matrix and/or support the curing process.

The amount mercapto groups on the surface of the silica may be in the range of between 0.1 and 1 weight percent, alternatively 0.4 to 1 weight percent or 0.4 to 0.6 weight percent.

In addition to the mercapto groups coupled to the silica, the silica may comprise a compatibilizer which is typically a (hydro-)carbon chain material having multiple carbon atoms (for instance at least 4 carbon atoms) along its chain. Such a compatibilizer may facilitate the mixing of the composition. In an example, the weight % of carbon surface load/functionalization is between 2 and 10, or alternatively between 3 and 8.

In another embodiment, pre-silanized precipitated silica is precipitated silica pre-reacted with a silica coupler comprising an alkoxyorganomercaptosilane.

In another embodiment, said pre-silanized precipitated silica is pre-hydrophobated, e.g. with a hydrocarbon chain material having multiple carbon atoms (for instance at least 4 carbon atoms) along its chain.

Said separate silica coupler (added to said rubber composition) may have a moiety reactive with hydroxyl groups (e.g. silanol groups) on said pre-silanized precipitated silica and/or another different moiety interactive with said natural rubber and/or synthetic polyisoprene.

In another embodiment, the rubber composition comprises less than 5 phr of oil. Amongst others, this may help to improve the stiffness of the rubber compound.

In a further embodiment, the rubber composition is essentially free of polyethylene glycol. While this material may be used in some winter tread compounds, it is not desired to have this substance in the present composition, in particular when used in carcass ply or belt ply coating compounds. In other words, the amount of polyethylene glycol in the composition may be less than 2 phr.

In still a further embodiment of the invention, the glass transition temperature of the solution styrene butadiene rubber is between −30° C. and −90° C., alternatively between −50° C. and −70° C. These ranges make amongst others sure that the tire may be used also in countries with relatively low temperatures. The glass transition temperature may be determined with the DSC (differential scanning calorimetry) method in accordance with ASTM D3418.

In still another embodiment, the solution styrene butadiene rubber is a tin-coupled polymer. In still another embodiment, the SSBR is functionalized for improved compatibility with silica. In addition, or alternatively the SSBR is thio-functionalized. This helps to improve stiffness of the compound and/or its hysteresis behavior. Thus, for instance, the SSBR may be a thio-functionalized, tin-coupled solution polymerized copolymer of butadiene and styrene.

In another embodiment, the solution styrene butadiene rubber has at least one of: a styrene content from 5% to 50%, a vinyl content from 5% to 60%, a styrene content from 10% to 20%, and a vinyl content from 20% to 40%.

In another embodiment of the invention the composition comprises from 1 phr to 10 phr antidegradants such as anti-ozonants and/or anti-oxidants. Alternatively, the amounts of such material may be from 1 phr to 5 phr. Suitable antidegradants as such are known in the prior art.

In another embodiment, the rubber composition comprises from 0.1 phr to 5 phr of an accelerator, optionally from 1 phr to 4 phr of an accelerator. Accelerators as such are known in the prior art.

In yet another embodiment, the rubber composition comprises from 75 phr to 90 phr of cis 1,4-polyisoprene rubber, from 10 phr to 25 phr of solution styrene butadiene rubber, from 70 phr to 90 phr pre-silanized precipitated silica, up to 15 phr carbon black, up to 10 phr of a resin, and up to 10 phr oil. This is a SSBR-containing advantageous example of the invention.

In another embodiment, the composition comprises from 90 phr to 100 phr of cis-1,4-polyisoprene rubber, from 0 phr to 10 phr of a diene rubber, from 70 phr to 90 phr pre-silanized precipitated silica, up to 10 phr carbon black, up to 5 phr of a resin, and up to 10 phr oil.

In an embodiment, the rubber composition is exclusive of addition of (added) precipitated silica to the rubber composition (thereby exclusive of addition of non-pre-silanized precipitated silica).

In another embodiment, the pre-silanized silica is not necessarily precipitated silica.

In one embodiment, where the rubber composition contains added precipitated silica (in addition to said pre-silanized precipitated silica), said rubber composition contains added silica coupler (silica coupler added to said rubber composition), where said silica coupler has a moiety reactive with hydroxyl groups (e.g. silanol groups) on said precipitated silica and said pre-silanized precipitated silica and another different moiety interactive with the elastomers of the rubber composition.

In one embodiment, said silica coupler added to said rubber composition is comprised of bis(3-triethoxysilylpropyl) polysulfide having an average of from about 2 to about 4 connecting sulfur atoms in its polysulfidic bridge.

Representative of the aforesaid silica coupler (silica coupling agent) having a moiety reactive with hydroxyl groups on pre-silanized precipitated silica and on precipitated silica and another moiety interactive with said elastomers, may be comprised of, for example:

(A) bis(3-trialkoxysilylalkyl) polysulfide containing an average in range of from about 2 to about 4, alternatively from about 2 to about 2.6 or from about 3.2 to about 3.8, sulfur atoms in its connecting bridge, or (B) an alkoxyorganomercaptosilane, or (C) their combination. Representative of such bis(3-trialkoxysilylalkyl) polysulfide is comprised of bis(3-triethoxysilylpropyl) polysulfide. As indicated, for the pre-silanized precipitated silica, the silica coupler may be desirably an alkoxyorganomercaptosilane. For the non-pre-silanized precipitated silica, the silica coupler may be desirably comprised of the bis(3-triethoxysilylpropyl) polysulfide.

The precipitated silica reinforcement may, for example, be characterized by having a BET surface area, as measured using nitrogen gas, in the range of, for example, about 40 to about 600, and more usually in a range of about 50 to about 300 square meters per gram. The BET method of measuring surface area might be described, for example, in the Journal of the American Chemical Society, Volume 60, as well as ASTM D3037.

Such precipitated silicas may, for example, also be characterized by having a dibutylphthalate (DBP) absorption value, for example, in a range of about 100 cc/100 g to about 400 cc/100 g, and more usually about 150 cc/100 g to about 300 cc/100 g.

The pre-hydrophobated precipitated silica utilized in accordance with this invention is hydrophobated prior to its addition to the rubber composition by treatment with at least one silane. Suitable silanes include but are not limited to alkylsilanes, alkoxysilanes, organoalkoxysilyl polysulfides and organomercaptoalkoxysilanes.

In an alternative embodiment, the pre-hydrophobated precipitated silica may be pre-treated with a silica coupling agent comprised of, for example, an alkoxyorganomercaptoalkoxysilane or combination of alkoxysilane and organomercaptoalkoxysilane prior to blending the pre-treated silica with the rubber instead of reacting the precipitated silica with the silica coupling agent in situ within the rubber. For example, see U.S. Pat. No. 7,214,731, the teachings of which are incorporated herein for the purpose of describing pre-hydrophobated precipitated silica and techniques for making such pre-hydrophobated precipitated silica.

The prehydrophobated precipitated silica may optionally be treated with a silica dispersing aid. Such silica dispersing aids may include glycols, such as fatty acids, diethylene glycols, polyethylene glycols, fatty acid esters of hydrogenated or non-hydrogenated $C_5$ or $C_6$ sugars, and polyoxyethylene derivatives of fatty acid esters of hydrogenated or non-hydrogenated $C_5$ or $C_6$ sugars. Exemplary fatty acids include stearic acid, palmitic acid and oleic acid. Exemplary fatty acid esters of hydrogenated and non-hydrogenated $C_5$ and $C_6$ sugars (e.g., sorbose, mannose, and arabinose) include, but are not limited to, the sorbitan oleates, such as sorbitan monooleate, dioleate, trioleate and sesquioleate, as well as sorbitan esters of laurate, palmitate and stearate fatty acids. Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups.

The optional silica dispersing aids, if used, are present in an amount ranging from about 0.1% to about 25% by weight based on the weight of the silica, with about 0.5% to about 20% by weight being suitable, and about 1% to about 15% by weight based on the weight of the silica also being suitable. Various pre-treated precipitated silicas are described in U.S. Pat. Nos. 4,704,414, 6,123,762 and 6,573,324. The teachings of U.S. Pat. Nos. 4,704,414, 6,123,762 and 6,573,324 are incorporated herein by reference.

In any case, the pre-hydrophobated precipitated silica is pre-hydrophobated by treating silica in an aqueous colloidal form thereof with both an organomercaptosilane and an alkylsilane in a weight ratio of said organomercaptosilane to said alkylsilane in a range of from 10/90 to 90/10; wherein said alkylsilane is of the general Formula (I):

wherein R is an alkyl radical having from 1 to 18 carbon atoms, preferably from 1 to 8, carbon atoms, such as, methyl, ethyl, isopropyl, n-butyl and octadecyl radicals, n is a numeral from 1 to 3 and X is a radical selected from halogens, namely chlorine or bromine, preferably a chlorine radical, and alkoxy radicals, preferably an alkoxy radical as $(R^1O)$—, wherein $R^1$ is an alkyl radical having from 1 to 3 carbon atoms, such as, methyl, ethyl and isopropyl radicals, preferably from methyl and ethyl radicals, and where said organomercaptosilane is of the general formula (II):

wherein X is a radical selected from halogens, such as chlorine or bromine, preferably a chlorine radical, and alkyl radicals having from 1 to 16 carbon atoms, preferably selected from methyl, ethyl, n-propyl, and n-butyl radicals; wherein $R^2$ is an alkyl radical having from 1 to 16 carbon atom, preferably from 1 to 4 carbon atoms, preferably selected from methyl and ethyl radicals and $R^3$ is an alkylene radical having from 1 to 16 carbon atoms, preferably from 1 to 4 carbon atoms, preferably a propylene radical; wherein n represents an integer from 0 to 3 with n preferably representing zero.

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to the aforesaid Condensed Chemical Dictionary and U.S. Pat. No. 5,094,829 as well as U.S. Pat. Nos. 5,708,069, 5,789,514 and 5,750,610 for a more detailed discussion.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptosilanes of Formula (II) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

Some non-limiting examples of pre-treated silicas (i.e., silicas that have been pre-surface treated with a silane) which are suitable for use in the practice of this invention include, but are not limited to, Ciptane® 255 LD and Ciptane® LP (PPG Industries) silicas that have been pre-treated with a mercaptosilane, and Coupsil® 8113 (Degussa) that is the product of the reaction between organosilane Bis(triethoxysilylpropyl) polysulfide (Si69) and Ultrasil® VN3 silica, and Coupsil® 6508, Agilon® 400 silica from PPG Industries, Agilon® 454 silica from PPG Industries, and Agilon® 458 silica from PPG Industries. Some representative examples of preferred pre-silanized precipitated silicas include Agilon® 400, Agilon® 454 and Agilon® 458 from PPG Industries.

Various commercially available precipitated silicas that may be used in combination with pre-silanized precipitated silica may be used, such as silicas from PPG Industries under the Hi-Sil trademark with designations 210, 243, etc.; silicas from Solvay with, for example, designations of Zeosil 1165MP and Zeosil 165GR; and silicas from Evonik with, for example, designations VN2 and VN3.

In one embodiment, the rubber composition is exclusive of addition of silica coupler to the rubber composition (thereby exclusive of silica coupler).

As indicated, in one embodiment, the rubber composition may contain a combination of additional silica coupler added to the rubber composition, particularly a bis(3-triethoxysilylpropyl) polysulfide containing an average of from about 2 to about 4 connecting sulfur atoms in its polysulfidic bridge together with an additional precipitated silica (non-pre-silanized precipitated silica) added to said rubber composition, wherein the ratio of pre-silanized precipitated silica to said precipitated silica is desirably at least 8/1, alternately at least 10/1.

In an embodiment, the rubber composition may include processing oil. Processing oil may be included in the rubber composition as extending oil typically used to extend elastomers. Processing oil may also be included in the rubber composition by addition of the oil directly during rubber compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom.

Commonly employed carbon blacks can be added as well, e.g. as additional filler component or for the sake of providing the tire component with black color. However, preferably the embodiments of the present invention comprise less than 5 phr carbon black or less than 3 phr carbon black or even no carbon black. Representative examples of carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 cm³/100 g to 150 cm³/100 g.

In one embodiment the rubber composition may contain a conventional sulfur containing organosilicon compound. Examples of suitable sulfur containing organosilicon compounds are of the formula:

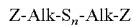 Z-Alk-S$_n$-Alk-Z  I in which Z is selected from the group consisting of

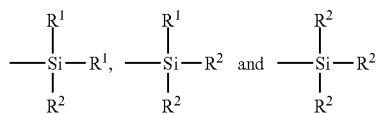

where R$^1$ is an alkyl group of 1 to 4 carbon atoms, cyclohexyl or phenyl; R$^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl) polysulfides. In one embodiment, the sulfur containing organosilicon compounds are 3,3'-bis(triethoxysilylpropyl) disulfide and/or 3,3'-bis(triethoxysilylpropyl) tetrasulfide. Therefore, as to formula I, Z may be

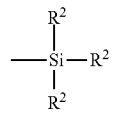

where R$^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, CH$_3$(CH$_2$)$_6$C(=O)—S—CH$_2$CH$_2$CH$_2$Si(OCH$_2$CH$_3$)$_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 phr to 5 phr. Typical amounts of fatty acids, if used, which can include stearic acid comprise about 0.5 phr to about 3 phr. Typical amounts of waxes comprise about 1 phr to about 5 phr. Often, microcrystalline waxes are used. Typical amounts of peptizers comprise about 0.1 phr to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 phr to about 4 phr, alternatively about 0.8 phr to about 1.5, phr. In another embodiment, combinations of a primary and a secondary accelerator might be used with the secondary accelerator being used in smaller amounts, such as from about 0.05 phr to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound. Suitable guanidines include dipheynylguanidine and the like. Suitable thiurams include tetramethylthiuram disulfide, tetraethylthiuram disulfide, and tetrabenzylthiuram disulfide.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

In another aspect of the invention, a tire is provided, the tire comprising a rubber composition in accordance with the invention or one or more of its embodiments. Such a tire is typically a pneumatic tire which is comprised of a generally toroidal-shaped carcass with an outer circumferential tread, two spaced beads, at least one reinforced ply extending from bead to bead, and sidewalls extending radially from and connecting said tread to said beads, wherein said tread is adapted to be ground-contacting, and wherein the tire further includes metal reinforcing wires which are embedded in the wire coat rubber composition of this invention.

In an embodiment, the tire comprises a belt ply, a carcass ply, an overlay ply or a ply strip. At least one of the plies or ply strips may have a coating, e.g. a coating added to wire material in a wire calendar or in other words a wire coat. Such coatings can be described as layers or sheets of rubber added to both sides of a plurality of parallelly extending (and spaced apart) wires. The coating comprises or consists of compositions in accordance with the invention or one or more of its embodiments described herein.

In another embodiment, a ply or ply strip comprises a plurality of essentially parallelly extending metal wires coated with the rubber composition, wherein the plurality of parallelly extending and spaced apart metal wires define a plane of parallelly extending metal wires which is calendered on both sides with the rubber composition.

In another embodiment the tire is one or more of a pneumatic tire, a passenger tire, a radial tire, a truck tire and a medium truck tire.

BRIEF DESCRIPTION OF THE DRAWINGS

The structure, operation, and advantages of the invention will become more apparent upon contemplation of the following description taken in conjunction with the accompanying drawings, wherein.

DETAILED DESCRIPTION OF THE EMBODIMENTS

Figure 1:
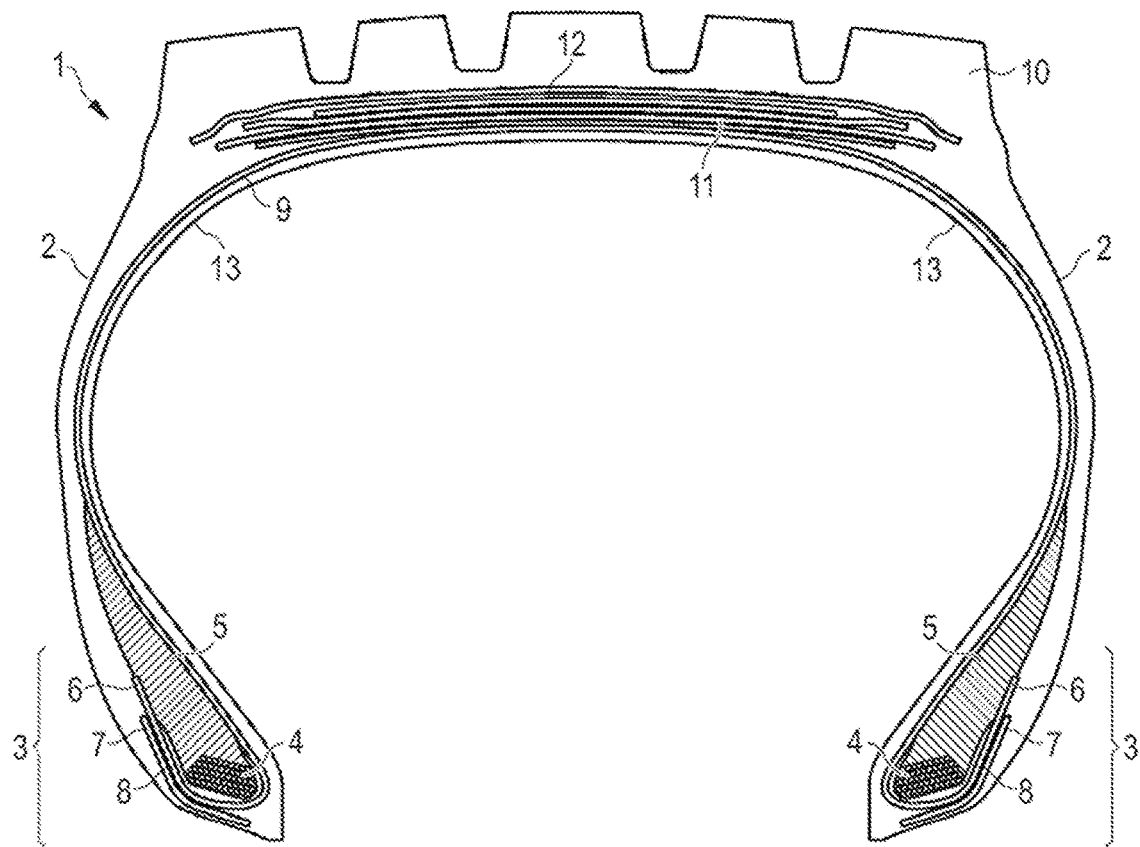
FIG. 1 is a schematic cross section of a tire comprising amongst others belt plies and carcass plies comprising the rubber composition in accordance with an embodiment of the invention.

FIG. 1 is a schematic cross-section of a tire 1. The tire 1 has a tread 10, an inner liner 13, a belt structure comprising four belt plies 11, a carcass ply 9, two sidewalls 2, and two bead regions 3 comprising bead filler apexes 5 and beads 4. The example tire 1 is suitable, for example, for mounting on a rim of a vehicle, e.g. a truck or a passenger car. As shown in FIG. 1, the belt plies 11 may be covered by an overlay ply 12. The carcass ply 9 includes a pair of axially opposite end portions 6, each of which is associated with a respective one of the beads 4. Each axial end portion 6 of the carcass ply 9 may be turned up and around the respective bead 4 to a position to anchor each axial end portion 6. One or more of the carcass ply 9, belt plies 11 and overlay ply 12 comprise a rubber composition in accordance with the invention and may have a plurality of substantially parallel reinforcing members made of metal wire. The turned-up portions 6 of the carcass ply 9 may engage the axial outer surfaces of two flippers 8 and axial inner surfaces of two chippers 7. As shown in FIG. 1, the example tread 10 may have four circumferential grooves, each groove essentially defining a U-shaped opening in the tread 10. The main portion of the tread 10 may be formed of one or more tread compounds, which may be any suitable tread compound or compounds.

While the embodiment of FIG. 1 suggests a plurality of tire components including for instance apexes 5, chippers 7, flippers 8 and overlay 12, such components are not mandatory for the invention. Also, the turned-up end of the carcass ply 9 is not necessary for the invention or may pass on the opposite side of the bead area 3 and end on the axially inner side of the bead 4 instead of the axially outer side of the bead 4. The tire could also have for instance more or less than four grooves.

Figure 2:
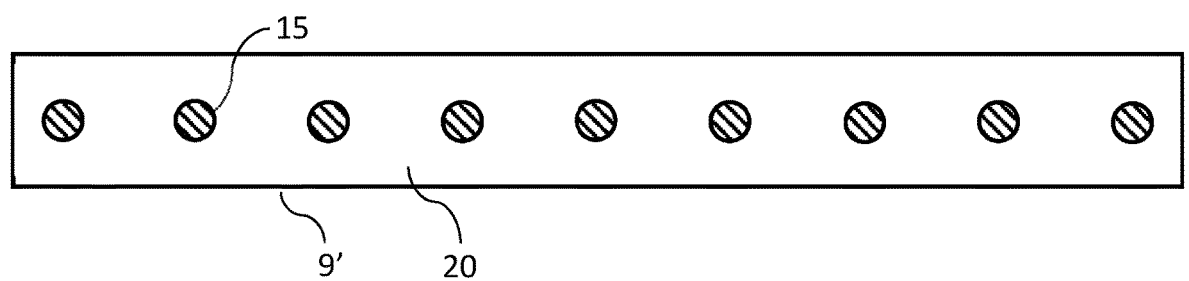
FIG. 2 is a schematic cross section of a ply comprising wires and a wire coat material in accordance with an embodiment of the invention.

The schematic cross-section of FIG. 2 shows a ply, e.g. a carcass, belt or overlay ply 9' which comprises a plurality of metal, for instance steel, wires 15 reinforcing the rubber composition material/wire coat 20. Typically, such a ply is made in a wire calendar in which a plurality of essentially parallel metal and spaced apart wires is coated from both sides with a layer or sheet of rubber composition 20. Such methods are well known to the person skilled in the art of tire building. After curing, the wires 15 are embedded in the rubber composition 20, reinforcing the same.

Metal wires 15 may be coated with brass for better adhesion properties with regards to connection of the wires 15 to the cured rubber composition 20. The wires 15 may also be dipped in dipping solutions or emulsions for better adhesion properties as known in the art. Neither a dip nor a metal coating is shown here in FIG. 2. For the sake of better adhesion of the compound 20 to the metal wire 15, the compound 20 may comprise cobalt salt. Moreover, the compound 20 can comprise zinc oxide which may also improve the adhesion between the metal wire 15 and the cured compound 20.

While the schematic drawing of FIG. 2 indicates nine wires, the number of parallel wires per ply could be different, for instance at least 5 or 10. The invention could also be used in a ply strip comprising the rubber composition, with the strip comprising only between 3 and 6 cords or wires.

Preferred examples of the rubber composition are shown in Table 1 in comparison with a Control sample. The control sample comprises carbon black as a filler material whereas the compounds according to the invention comprise pre-silanized precipitated silica. Moreover, the first example comprises a significant amount of an SSBR whereas the control and the second example each comprise 100 phr natural rubber. Moreover, the first and second examples comprise also a resin system of reactive resins and higher amounts of accelerators and antidegradants than the control sample.

TABLE 1

| | Parts by weight (phr) | | |
|---|---|---|---|
| Material | Control | Inventive Example 1 | Inventive Example 2 |
| Natural rubber | 100 | 83 | 100 |
| Carbon Black | 60 | 0 | 0 |
| SSBR[1] | 0 | 17 | 0 |
| Pre-silanized Precipitated Silica[2] | 0 | 80 | 80 |
| Zinc Oxide | 10 | 8 | 8 |
| Resin[3] | 0 | 2.5 | 2.5 |
| Oil[4] | 1 | 1 | 1 |
| Antidegradants | 2 | 3 | 3 |
| Stearic Acid | 0 | 1 | 1 |
| Cobalt Salt | 0.5 | 0.5 | 0.5 |
| Accelerator[5] | 1 | 1.5 | 1.5 |
| Sulfur | 5 | 5 | 5 |

[1]SSBR as Sprintan ™ SLR 3402 of the company Trinseo ™ having a $T_g$ of about −62° C.
[2]Pre-silanized (pre-hydrophobated) precipitated silica as Agilon 400 ™ from PPG Industries as precipitated silica chemically treated with an alkoxyorganomercaptosilane
[3]Resin system comprising a phenol formaldehyde reactive type resin and a hexamethoxymethylmelamine
[4]Naphthenic oil
[5]Sulfur cure accelerators as sulfenamide Table 2 discloses mechanical test results for the control composition and the example compositions disclosed in Table 1. Shore A hardness of both inventive examples has increased over the control sample. Rebound values have also increased significantly by more than 5% over the control sample. Rebound can be a good indicator for stiffness/hysteresis ratio. G' at 1% and G' at 15% have also increased significantly in the order of 50% for both inventive examples. While tangent delta values have increased for Example 1, it remains flat for example 2 in comparison with the control sample. Modulus values at 100% and 200% keep roughly the level of the control. Elongation at break values have increased. Tensile strength has also increased when comparing the inventive examples with the control sample. The improvement in the rebound test values as well as the improvement in the G' and shore A hardness values, indicating a high compound stiffness, predict together also an improvement of the component's hysteresis behavior which has also a positive influence on rolling resistance.

TABLE 2

| Test/Property | Units | Control | Inventive Example 1 | Inventive Example 2 |
|---|---|---|---|---|
| Shore A hardness(23° C.) [a] | — | 70.1 | 72.6 | 71.5 |
| Rebound(23° C.) [b] | % | 48.38 | 52.1 | 50.27 |
| G' (1%) [c] | MPa | 2.78 | 4.41 | 4.6 |
| G' (15%) [c] | MPa | 1.48 | 2.25 | 2.08 |
| Tan delta (10%) [c] | — | 0.15 | 1.3 | 0.15 |
| Modulus (100%) [d] | MPa | 3.7 | 3.1 | 3.7 |
| Modulus (200%) [d] | MPa | 9.6 | 9.4 | 7.7 |
| Elongation at break [d] | % | 316 | 365 | 490 |
| Tensile strength [d] | MPa | 16.0 | 17.0 | 20.0 |

[a] Shore A hardness measured according to ASTM D2240.
[b] Rebound measured on a Zwick Roell 5109 rebound resilience tester according to DIN 53512/ASTM D1054 at given temperature.
[c] Data obtained with an RPA 2000 ™ Rubber Process Analyzer of Alpha Technologies based on ASTM D5289.
[d] Ring sample test based on ASTM D412 and DIN 53504, percentages are percentages of elongation, respectively strain; tensile strength is stress at break; elongation is elongation at break in %.

The amounts of materials are usually expressed in parts of material per 100 parts of rubber by weight (phr).

If an amount of ingredient is mentioned with "up to" herein, this shall include also the option of 0 (zero) phr of that ingredient or "from 0 to".

Variations in the present invention are possible in light of the provided description. While certain representative embodiments, examples and details have been shown for the purpose of illustrating the subject invention, it will be apparent to those skilled in this art that various changes and modifications can be made therein without departing from the scope of the invention. It is, therefore, to be understood that changes may be made in the particular example embodiments described which will be within scope of the invention as defined by the following appended claims.

In any case the above described embodiments and examples shall not be understood in a limiting sense. In particular, the features of the above embodiments may also be replaced or combined with one another.

The invention claimed is:

1. A wire coat rubber composition for a tire, the rubber composition comprising: 75 phr to 90 phr of cis 1,4-polyisoprene rubber, from 10 phr to 25 phr of solution-polymerized styrene-butadiene rubber, from 65 phr to 95 phr of pre-silanized precipitated silica, from 0.1 phr to 5 phr of a cobalt salt, from 0 phr to 15 phr carbon black, from 0 phr to 10 phr of a resin, and from 0 phr to 10 phr oil, wherein the pre-silanized precipitated silica has a CTAB adsorption surface area which is within the range of 130 m$^2$/g to 210 m$^2$/g, wherein the solution-polymerized styrene-butadiene rubber has a glass transition temperature which is within the range of −30° C. and −90° C., and wherein the solution-polymerized styrene-butadiene rubber is tin-coupled or thio-functionalized.

2. The wire coat rubber composition of claim 1, wherein the solution-polymerized styrene-butadiene rubber has a bound styrene content which is within the range of 10% to 20%, and a vinyl content which is within the range of 20% to 40%.

3. The wire coat rubber composition of claim 1, wherein the solution-polymerized styrene-butadiene rubber has a glass transition temperature which is within the range of −50° C. and −70° C. and wherein the solution-polymerized styrene-butadiene rubber is tin-coupled.

4. The wire coat rubber composition of claim 1, wherein the solution-polymerized styrene-butadiene rubber is functionalized for improved compatibility with silica, and wherein the solution-polymerized styrene-butadiene rubber is thio-functionalized.

5. The wire coat rubber composition of claim 1 wherein the pre-silanized precipitated silica is present at a level which is within the range of from 70 phr to 90 phr.

6. The wire coat rubber composition of claim 1, wherein said pre-silanized precipitated silica is precipitated silica pre-reacted with a silica coupler comprised of bis(3-triethoxysilylpropyl)polysulfide containing an average of from 1 to 5 connecting sulfur atoms in its polysulfidic bridge or an alkoxyorganomercaptosilane.

7. The wire coat rubber composition of claim 1, wherein said pre-silanized precipitated silica is pre-hydrophobated by treating silica with both an organomercaptosilane and an alkylsilane at a weight ratio of said organomercaptosilane to said alkylsilane which is within the range of from 10/90 to 90/10; wherein said alkylsilane is of the general Formula): $X_n$—Si—$R_{4-n}$, wherein R is an alkyl radical having from 1 to 8, carbon atoms, wherein n is a numeral from 1 to 3, and X is a halogens or an alkoxy radical of the formula: $R^1O$—, wherein $R^1$ is an alkyl radical having from 1 to 3 carbon atoms; and where said organomercaptosilane is of the general formula: $(X)_n(R^2O)_{3-n}$—Si—$R^3$—SH), wherein X is a halogen, wherein $R^2$ is an alkyl radical containing from 1 to 4 carbon atoms, and $R^3$ is an alkylene radical containing from 1 to 4 carbon atoms, and wherein n represents an integer from 0 to 3.

8. The wire coat rubber composition of claim 1, wherein the cobalt salt is present at a level which is within the range of 0.2 phr to 2 phr.

9. The wire coat rubber composition of claim 1, wherein the carbon black is present at a level of less than 3 phr.

10. The wire coat rubber composition of claim 1, wherein the level of resin in the composition is less than 5 phr.

11. The wire coat rubber composition of claim 1, wherein the wire coat rubber composition contains less than 5 phr oil.

12. The wire coat rubber composition of claim 1 further comprising from 1 to 15 phr of sulfur.

13. The wire coat rubber composition of claim 1, further comprising from 1 to 20 phr of zinc oxide.

14. A tire comprising a ply or a ply strip, wherein the ply or the ply strip is comprised of wires which are coated with the wire coat rubber composition according to claim 1.

* * * * *